(12) United States Patent
Song et al.

(10) Patent No.: US 10,261,559 B2
(45) Date of Patent: *Apr. 16, 2019

(54) PREDICTING FUTURE POWER LEVEL STATES FOR PROCESSOR CORES

(71) Applicant: Intel Corporation, Santa Clara, CA (US)

(72) Inventors: Justin J. Song, Olympia, WA (US); Qian Diao, Beijing (CN)

(73) Assignee: Intel Corporation, Santa Clara, CA (US)

( * ) Notice: Subject to any disclaimer, the term of this patent is extended or adjusted under 35 U.S.C. 154(b) by 199 days.

This patent is subject to a terminal disclaimer.

(21) Appl. No.: 15/040,160

(22) Filed: Feb. 10, 2016

(65) Prior Publication Data

US 2016/0202745 A1 Jul. 14, 2016

Related U.S. Application Data

(63) Continuation of application No. 13/208,749, filed on Aug. 12, 2011, now Pat. No. 9,285,855, which is a continuation of application No. 12/001,159, filed on Dec. 10, 2007, now Pat. No. 8,024,590.

(51) Int. Cl.
*G06F 1/28* (2006.01)
*G06F 1/00* (2006.01)
*G06F 1/32* (2006.01)
*G06F 1/3203* (2019.01)

(52) U.S. Cl.
CPC .............. *G06F 1/28* (2013.01); *G06F 1/00* (2013.01); *G06F 1/3203* (2013.01)

(58) Field of Classification Search
USPC .............. 713/321, 322, 323, 300, 330
See application file for complete search history.

(56) References Cited

U.S. PATENT DOCUMENTS

| | | | |
|---|---|---|---|
| 5,163,153 A | 11/1992 | Cole et al. | |
| 5,522,087 A | 5/1996 | Hsiang | |
| 5,590,341 A | 12/1996 | Matter | |
| 5,931,960 A | 8/1999 | Hsu | |
| 6,654,895 B1 * | 11/2003 | Henkhaus | G06F 1/3203 710/18 |
| 6,748,546 B1 | 6/2004 | Mirov et al. | |
| 6,823,516 B1 | 11/2004 | Cooper | |
| 6,829,713 B2 | 12/2004 | Cooper et al. | |
| 6,996,728 B2 | 2/2006 | Singh | |

(Continued)

FOREIGN PATENT DOCUMENTS

EP 1 282 030 A1 2/2003

OTHER PUBLICATIONS

R. Todling, et al., "Some Strategies for Kalman Filtering and Smoothing," 1996, pp. 1-21.

(Continued)

*Primary Examiner* — Kim Huynh
*Assistant Examiner* — Joshua Neveln
(74) *Attorney, Agent, or Firm* — Trop, Pruner & Hu, P.C.

(57) ABSTRACT

In one embodiment, the present invention includes a method for providing power state change information from a plurality of cores of a processor to a predictor at a periodic interval and generating a prediction to indicate a predicted operation level of the cores during a next operating period. Other embodiments are described and claimed.

20 Claims, 4 Drawing Sheets

(56) References Cited

U.S. PATENT DOCUMENTS

| | | | |
|---|---|---|---|
| 7,010,708 B2 | 3/2006 | Ma | |
| 7,043,349 B2 | 5/2006 | Terrell | |
| 7,093,147 B2 | 8/2006 | Farkas et al. | |
| 7,111,179 B1 | 9/2006 | Girson et al. | |
| 7,272,730 B1 | 9/2007 | Acquaviva et al. | |
| 7,437,270 B2 | 10/2008 | Song et al. | |
| 7,454,632 B2 | 11/2008 | Kardach | |
| 7,529,956 B2 | 5/2009 | Stufflebeam | |
| 7,539,885 B2 | 5/2009 | Ma | |
| 7,730,340 B2 | 6/2010 | Hu et al. | |
| 7,903,116 B1 | 3/2011 | Klock et al. | |
| 2001/0044909 A1 | 11/2001 | Oh et al. | |
| 2002/0194509 A1 | 12/2002 | Pante et al. | |
| 2003/0061383 A1 | 3/2003 | Zilka | |
| 2004/0064752 A1 | 4/2004 | Kazachinsky et al. | |
| 2004/0098560 A1 | 5/2004 | Storvik et al. | |
| 2004/0139356 A1 | 7/2004 | Ma | |
| 2004/0268166 A1 | 12/2004 | Farkas et al. | |
| 2005/0022038 A1 | 1/2005 | Kaushik et al. | |
| 2005/0033881 A1 | 2/2005 | Yao | |
| 2005/0132238 A1 | 6/2005 | Nanja | |
| 2006/0050670 A1 | 3/2006 | Hillyard et al. | |
| 2006/0053326 A1* | 3/2006 | Naveh | G06F 1/3203 713/323 |
| 2006/0059286 A1 | 3/2006 | Bertone et al. | |
| 2006/0069936 A1 | 3/2006 | Lint et al. | |
| 2006/0149975 A1 | 7/2006 | Rotem et al. | |
| 2006/0184287 A1 | 8/2006 | Belady et al. | |
| 2007/0005995 A1 | 1/2007 | Kardach et al. | |
| 2007/0033425 A1 | 2/2007 | Clark | |
| 2007/0106827 A1 | 5/2007 | Boatright et al. | |
| 2007/0156992 A1 | 7/2007 | Jahagirdar | |
| 2007/0157042 A1 | 7/2007 | Jahagirdar et al. | |
| 2007/0239398 A1 | 10/2007 | Song et al. | 702/186 |
| 2007/0239972 A1 | 10/2007 | Orita et al. | |
| 2007/0245163 A1 | 10/2007 | Lu et al. | |
| 2008/0028240 A1 | 1/2008 | Arai et al. | |
| 2008/0104425 A1 | 5/2008 | Gunther et al. | |
| 2008/0201591 A1* | 8/2008 | Hu | G06F 1/3203 713/323 |
| 2008/0250260 A1 | 10/2008 | Tomita | |
| 2009/0006871 A1 | 1/2009 | Liu et al. | |
| 2009/0013201 A1* | 1/2009 | He | G06F 1/3203 713/322 |
| 2009/0049312 A1* | 2/2009 | Min | G06F 1/3228 713/300 |
| 2009/0150695 A1 | 6/2009 | Song et al. | |
| 2009/0150696 A1 | 6/2009 | Song et al. | |
| 2009/0158061 A1 | 6/2009 | Schmitz et al. | |
| 2009/0158067 A1 | 6/2009 | Bodas et al. | |
| 2009/0172375 A1 | 7/2009 | Rotem et al. | |
| 2009/0172428 A1 | 7/2009 | Lee | |
| 2009/0235105 A1 | 9/2009 | Branover et al. | |
| 2010/0115309 A1 | 5/2010 | Carvalho et al. | |
| 2010/0146513 A1 | 6/2010 | Song | |
| 2010/0191997 A1 | 7/2010 | Dodeja et al. | |
| 2011/0087900 A1 | 4/2011 | Lakhanpal et al. | |
| 2011/0106282 A1 | 5/2011 | Craig et al. | |

OTHER PUBLICATIONS

R.E. Kalman, "A New Approach to Linear Filtering and Prediction Problems," 1960, pp. 1-12.

Intel Technology Journal, "Power and Thermal Management in the Intel® Core™ Duo Processor," May 15, 2006, pp. 109-122.

U.S. Patent and Trademark Office, Office Action dated Nov. 18, 2010 in U.S. Appl. No. 12/001,186.

U.S. Patent and Trademark Office, Office Action dated Aug. 13, 2010 with Reply filed on Nov. 10, 2010 in U.S. Appl. No. 12/001,186.

State Intellectual Property Office, P.R. China, First Office Action dated Jul. 30, 2010 in Chinese patent application No. 200810187162.5.

European Patent Office, Communication Pursuant to Article 94(3) EPC, dated Sep. 3, 2009, in EP patent application No. 08 253 932.1.

European Patent Office, European Search Report dated Jun. 22, 2009 in a related application.

European Patent Office, European Search Report dated Jun. 9, 2009, in a related application.

L. Benini, et al., "System-Level Dynamic Power Management," Low-Power Design, 1999, pp. 23-31.

Ravindra Jejurikar, et al., "Leakage Aware Dynamic Voltage Scaling for Real-Tim Embedded Systems," Design Automation Conference, 2004, pp. 275-280.

Ravindra Jejurikar, et al., "Dynamic Slack Reclamation With Procrastination Scheduling in Real-Time Embedded Systems," Design Automation Conference, 2005, pp. 13-17.

Reply to Office Action dated Nov. 18, 2010 in U.S. Appl. No. 12/001,186.

Greg Welch, et al., "An Introduction to the Kalman Filter," Jul. 24, 2006, 16 pages.

\* cited by examiner

PREDICTING FUTURE POWER LEVEL STATES FOR PROCESSOR CORES

This application is a continuation of U.S. patent application Ser. No. 13/208,749, filed Aug. 12, 2011, which is a continuation of U.S. patent application Ser. No. 12/001,159, filed Dec. 10, 2007, now U.S. Pat. No. 8,024,590, issued Sep. 20, 2011, the content of which is hereby incorporated by reference.

BACKGROUND

Power and thermal management are becoming more challenging than ever before in all segments of computer-based systems. While in the server domain, the cost of electricity drives the need for low power systems, in mobile systems battery life and thermal limitations make these issues relevant. Optimizing a system for maximum performance at minimum power consumption is usually done using the operating system (OS) to control hardware elements. Most modern OS's use the Advanced Configuration and Power Interface (ACPI) standard, e.g., Rev. 3.0b, published Oct. 10, 2006, for optimizing the system in these areas. An ACPI implementation allows a core to be in different power-saving states (also termed low power or idle states) generally referred to as so-called C1 to Cn states.

When the core is active, it runs at a so-called C0 state, but when the core is idle, the OS tries to maintain a balance between the amount of power it can save and the overhead of entering and exiting to/from a given state. Thus C1 represents the low power state that has the least power savings but can be switched on and off almost immediately, while extended deep-low power states (e.g., C3) represent a power state where the static power consumption is negligible, but the time to enter into this state and respond to activity (i.e., back to C0) is quite long. Note that different processors may include differing numbers of core C-states, each mapping to one ACPI C-state. Multiple core C-states can map to the same ACPI C-state.

OS C-state policy has a number of drawbacks. First, it selects C-state based on historical central processing unit (CPU) utilization (i.e., C0 residency time). For a dynamic workload this decision is often wrong, resulting in either less power savings or large performance losses caused by wrongfully entering deep sleep states with long entry/exit latencies. Second, CPU utilization is sampled at a coarse granularity, e.g., 100 milliseconds (ms). Some transient opportunities such as an idle state lasting for hundreds of microseconds (μs) could be missed. For example, if the last 100 ms CPU utilization is 85%, the OS will use the C1 state. At this utilization level, dynamic server workloads still have many 100-500 μs long idle periods. Third, the policy does not consider activities of other cores in the same package. Since server workloads are typically multi-tasked and each task is short, if one core is in a deep sleep state and unable to service a task in time, other cores with a lighter load may be able to accommodate these tasks. Current approaches thus fail to extract additional power savings.

DETAILED DESCRIPTION

Embodiments can accurately and in real time perform CPU power state pattern prediction (e.g., idle-busy patterns) and accordingly select a most appropriate power level state for cores of a processor package, maximizing power savings without any corresponding performance degradation. More specifically, a predictor to predict future active and idle power state residency may be provided. In one embodiment, the predictor may use a Kalman filter algorithm. Based on data from the package cores' active (i.e., C0 state) and lower power (i.e., non-zero C-state) residency, a prediction is computed. Then a decision for future C-state based on the prediction decision can be made at a predetermined interval. The data can include all C-state entry/exit events (i.e., for all package cores) during a monitor period. From this, an overlapping of idle cores in the same package can be computed. In one embodiment, the interval may be every 500 μs. Note that the C-states described herein are for an example processor such as an advanced Intel® Architecture 32 (IA-32) processor available from Intel Corporation, Santa Clara, Calif., although embodiments can equally be used with other processors. Shown in Table 3 below is an example designation of core C-states available in one embodiment, and Table 4 maps these C-states to the corresponding ACPI states. However, understand that the scope of the present invention is not limited in this regard.

A most appropriate core C-state for the package to maximize power savings while not affecting performance, referred to herein as C*, is selected based on distribution of these patterns in the next interval. If the determined C* state is deeper than an OS C-state policy's decision (i.e., $C^{OS\_CoreX}$ for core X) for a given core, then it will be used as the destination C-state of that core when entering a low power state during the next interval.

Embodiments may be deployed in conjunction with OS C-state policy or in platform firmware with an interface to OS C-state policy. Various implementations may be realized on a per physical CPU package basis, without any hardware or user software changes. Embodiments may realize resulting power savings (e.g., on a quad-core processor) of up to 34% (or 8-9 Watts/package) in some implementations.

Figure 1:
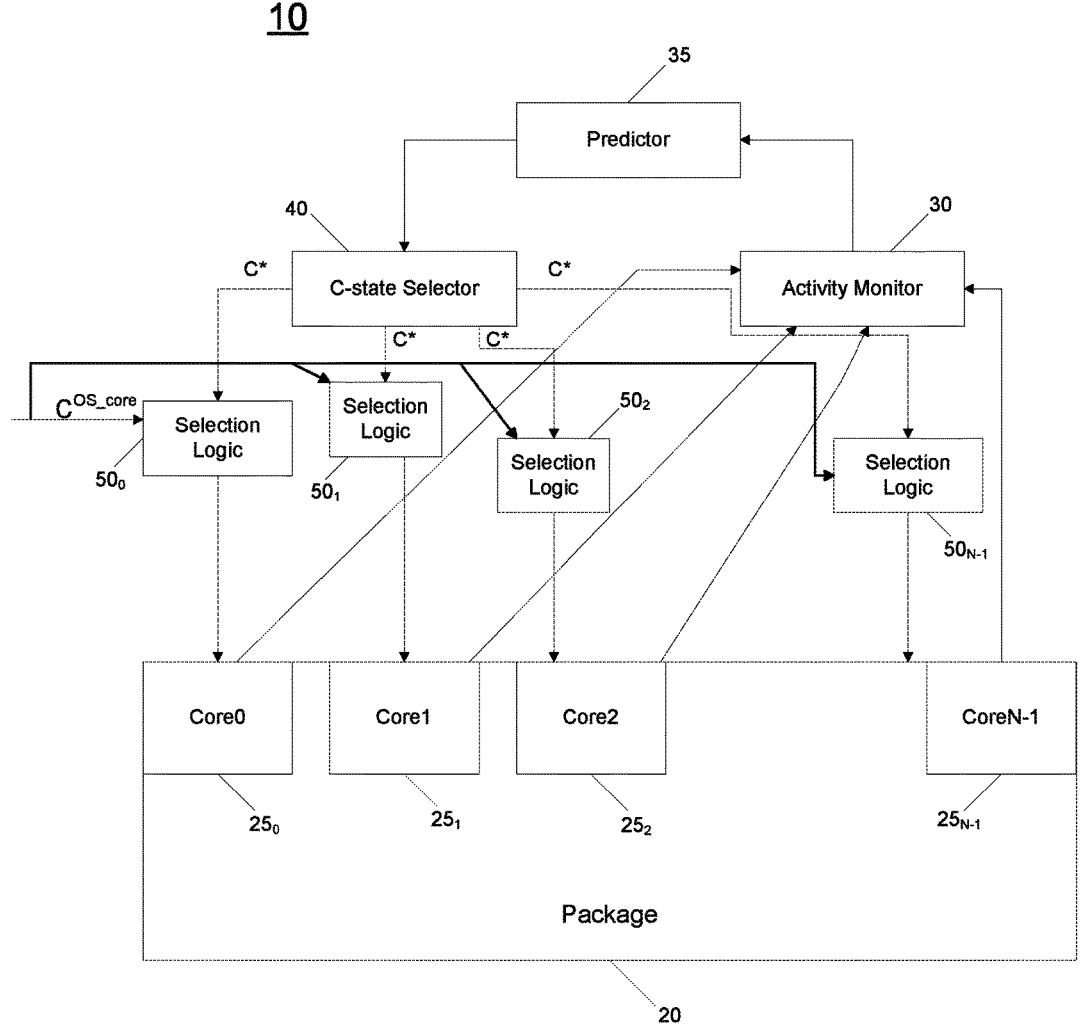
FIG. 1 is a block diagram of a prediction mechanism in accordance with one embodiment of the present invention.

Referring now to FIG. 1, shown is a block diagram of a prediction mechanism in accordance with one embodiment of the present invention. As shown in FIG. 1, system 10 includes a processor package 20 having a plurality of processor cores $25_0$-$25_{n-1}$ (generically core 25). The number of cores may vary in different implementations, from dual-core packages to many-core packages including potentially large numbers of cores. Each core 25 may include various logic and control structures to perform operations on data responsive to instructions. Depending on a given workload being undertaken within package 20, one or more cores 25 may not have active tasks to perform at a given time period. When a core 25 experiences a power state change event (e.g., a idling event, or an interrupt or break event such as a snoop transaction, an internal processor interrupt (IPI) or an external (e.g., input/output) interrupt if the core is already in an idle state), information may be provided from core 25 to an activity monitor 30, which may include a buffer to store time stamp information associated with this event. Note that in FIG. 1, the solid lines extending from each core 25 to activity monitor 30 (as well as the other solid lines) represent data flow for prediction operations. As will be described further below, the dashed lines in FIG. 1 represent control flow for controlling an activity state of the cores.

Activity monitor 30 may thus receive incoming data from the various cores 25 regarding their current activity levels. The buffer of activity monitor 30 may be arranged in various manners. In one embodiment, the buffer may be adapted to store for each core 25, an indication of a time stamp associated with each power state change event. Activity monitor 30 thus intercepts and time stamps the events in which CPU cores enter and exit a non-zero C-state. In one embodiment, the record is stored in a kernel buffer. Then, at predetermined intervals which, in one embodiment may be approximately 500 µs, activity monitor 30 provides monitored data to a predictor 35. This monitored data may thus include time stamp data as well as the activity state to indicate, during the interval of storage, how long each core was in a given state.

Predictor 35 may use this information to generate a pattern distribution for predicted core states for the next interval. While not limited in this regard, in one embodiment predictor 35 may execute a given prediction algorithm such as a Kalman filter algorithm to generate this pattern distribution. Furthermore, understand that the pattern distribution may vary widely, depending on a number of low power states supported, as well as a given number of cores, length of the prediction period and so forth. For ease of discussion, a pattern distribution including three different patterns will be described herein. However, it is to be understood the scope of the present invention is not limited in this regard and in different embodiments, more or fewer such patterns may be provided, e.g., with varying granularities as to a number of cores at a given activity level.

This pattern distribution information is thus provided from predictor 35 to a selector 40, which may select a most appropriate low power state for a given core, i.e., C*, based on the pattern distribution. In some embodiments, this C* value may be determined on a per core basis, while in other embodiments a single C* value may be determined for the entire package. Of course other granularities in between may also be realized. Selector 40 provides the C* value to a plurality of comparison logic $50_0$-$50_{n-1}$ (generically comparison logic 50), each of which is associated with a given core 25. As shown in FIG. 1, each selection logic 50 is further adapted to receive a low power state decision, $C_{OS\_coreX}$, which is the OS C-state policy decision for a given core. Comparison logic 50 may be adapted to select the deeper of the two C-state decisions to provide to its associated core 25. While shown with this particular implementation in the embodiment of FIG. 1, the scope of the present invention is not limited in this regard. In some embodiments, monitor 30, predictor 35, selector 40 and logic 50 all may be implemented using circuitry of package 20 such as a given core 25, executing software or firmware in accordance with an embodiment of the present invention. However, other embodiments may be implemented in other locations such as a performance management unit (PMU) of a given platform.

In one embodiment, the following three patterns may be calculated to predict package activity: (1) PatternA: package is idle (all cores inside are idle); (2) PatternB: package is busy (all cores inside are busy); and (3) PatternC: package partial idle (remaining cases—at least one core is busy and at the same time at least one core is idle). This third pattern depicts an idle/busy overlapping scenario. Using the cores' entry/exit C-state time stamps which are available, the three pattern distribution prediction can be computed. An example output of a prediction in accordance with one embodiment of the present invention is shown in Table 1, assuming a 500 µs interval period.

TABLE 1

| | |
|---|---|
| % PatternA in next T1 | 25% (25% * 500 = 125 µs package in patternA) |
| % PatternB in next T1 | 15% (15% * 500 = 75 µs package in patternB) |
| % PatternC in next T1 | 60% (60% * 500 = 300 µs package in patternC) |

Thus as shown in Table 1 for an interval period T1 an idle package pattern is predicted for 25% of the time (i.e., 125 µs), while all cores are predicted to be active for 15% of the time (i.e., 75 µs), and during the remaining 60% of the next prediction period, at least one core is active and at least one core idle (i.e., 300 µs). The manner of generating these pattern predictions may vary in different embodiments. In one embodiment, the predictions may use a Kalman filter, as will be discussed further below, however other implementations are possible.

Selector 40 then uses this prediction information to select a C* state for every core in the package. During the next timeslice (i.e., periodic interval), whenever a core is about to idle, the determined C* state is compared with the C-state decision made by the OS C-state policy, $C^{OS\_coreX}$. If C* is deeper than $C^{OS\_coreX}$, the core about to idle may be placed into this state. Otherwise, the OS C-state policy decision is used.

A Kalman filter model (KFM) models a partially observed stochastic process with linear dynamics and linear observations, both subject to Gaussian noise. It is an efficient recursive filter that estimates the state of a dynamic system from a series of incomplete and noisy measurements. Based on a KFM, the CPU package activity as set forth in a number of predetermined patterns (e.g., percentage of Patterns A, B and C) are considered the observations of a real number stochastic process discretised in the time domain, denoted by $y_{1:t} = (y_1 \ldots y_t)$. The hidden state of the process, $x_{1:t} = (x_1 \ldots x_t)$, is also represented as a vector of real numbers. The linear stochastic different equation in KFM is:

$$x(t)=Ax(t-1)+w(t-1)p(w)\sim N(0,Q)x(0)\sim N(x_{1|0}, V_{1|0}) \quad [\text{EQ. 1}]$$

And the measurement equation is:

$$y(t)=Cx(t)+V(t)p(v)\sim N(0, R) \quad [\text{EQ. 2}]$$

The n×n transition matrix A in the difference Equation 1 relates the state at the previous t−1 time step to the state at the current step t, in the absence of either a driving function or process noise. Here n is the number of hidden states. In our task, m=n is the number of possible CPU activity states. $x_{1|0}, V_{1|0}$ are the initial mean and variance of the sate, Q is the system covariance for the transition dynamics noises, and R is the observation covariance for the observation noises. The transition of observation functions is the same for all time and the model is said to be time-invariant or homogeneous.

Using KFM, values can be predicted on the future time, given all the observations up to the present time. However, we are generally unsure about the future, and thus a best guess is computed, as well as a confidence level. Hence a probability distribution over the possible future observations is computed, denoted by $P(Y_{t+h}=y|y_{1:t})$, where k>0 is the horizon, i.e., how far into the future to predict.

Given the sequence of observed values $(y_1-y_t)$, to predict the new observation value is to compute $P(Y_{t+h}=y|y_{1:t})$ for some horizon k>0 into the future. Equation 3 is the computation of a prediction about the future observations by marginalizing out the prediction of the future hidden state.

$$P(Y_{t+h} = y \mid y_{1:t}) = \sum_x P(Y_{t+h} = y \mid X_{t+h} = x) P(X_{t+h} = x \mid y_{1:t}) \quad [\text{EQ. 3}]$$

In the right part of the Equation, we compute $P(X_{t+h}=x|y_{1:t})$ by the algorithm of the fixed-lag smoothing, i.e., $P(X_{t-L}=x|y_{1:t})$,L>0, L is the lag. So before diving into the details of the algorithm, a fixed-lag smoothing in KFM is first introduced.

A fixed-lag Kalman smoother (FLKS) is an approach to perform retrospective data assimilation. It estimates the state of the past, given all the evidence up to the current time, i.e., $P(X_{t-L}=x|y_{1:t})$,L>0, where L is the lag, e.g., we might want to figure out whether a pipe broke L minutes ago given the current sensor readings. This is traditionally called "fixed-lag smoothing", although the term "hindsight" might be more appropriate. In the offline case, this is called (fixed-interval) smoothing; this corresponds to computing $P(X_{T-L}=x|y_{1:T})$,T≥L≥1.

In the prediction algorithm, there are h more forward and backward passes. The computation of the passes is similar to that in the smoothing process. The only difference is that in the prediction step the initial value of the new observation is null, which means $y_{1:T+h}=[y_{1:T}\ y_{null}^1 \ldots y_{null}^h]$. The prediction algorithm estimates the value of the $y_{1:T+h}=[y_{1:T}\ y_{T+1} \ldots y_{T+h}]$ by performing retrospective data assimilation on all the evidence up to the current time plus the $y_{1:T+h}=[y_{1:T}y_{null}^1\ y_{null}^h]$. In practice, we consider using the previous steps as the prior data, for example, if h=1, then $y_{T+1}=(y_{T-1}+y_T)/2$ rather than $y_{T+1}$=null.

Table 2 shows the pseudo code of the prediction algorithm.

TABLE 2 function Predicting $(y_{1:T}, x_{1|0}, V_{1|0}, A, C, Q, R)$
  $x_{0|0} = x_{1|0}$
  $V_{0|0} = V_{1|0}$
  $y_{T+1} = (y_{T-1}+y_T)/2$;
  for t = 1: T+1
    $(x_{t|t}, V_{t|t}, L_t) = \text{Fwd}(y_t, x_{t-1|t-1}, V_{t-1|t-1}, A, C, Q, R)$
  end
  for t = T:-1:1
    $(x_{t|T}, V_{t|T}, V_{t-1,t|T}) = \text{Back}(x_{t+1|T}, V_{t+1|T}, x_{t|t}, V_{t|t}, A, Q)$
  end In Table 2, Fwd and Back are the abstract operators. For each Fwd (forwards pass) operation of the first loop (for t=1:T), we firstly compute the inference mean and variance by $x_{t|t-1}=Ax_{t-1|t-1}$ and $V_{t|t-1}=AV_{t-1|t-1}A'+Q$; then compute the error in the inference (the innovation), the variance of the error, the Kalman gain matrix, and the conditional log-likelihood of this observation by $err_t=y_t-Cx_{t|t-1}$, $S_t=CV_{t|t-1}C'+R$, $K_t=V_{t|t-1}C'S_t^{-1}$, and $L_t=\log(N(err_t;0,S_t))$ respectively; finally we update the estimates of the mean and variance by $x_{t|t}=x_{t|t-1}+K_t err_t$ and $V_{t|t}=V_{t|t-1}-K_t S_t K_t'$.

For each Back (backwards pass) operation of the second loop (for t=T-1:-1:1), at first we compute the inference quantities by $x_{t+1|t}=Ax_{t|t}$ and $V_{t+1|t}=AV_{t|t}A'+Q$; then compute the smoother gain matrix by $J_t=V_{t|t}A'V_{t+1|t}^{-1}$; finally we compute the estimates of the mean, variance, and cross variance by $x_{t:T}=x_{t|t}+J_t(x_{t+1|T}-x_{t+1|t})$, $V_{t|T}=V_{t|t}+J_t(V_{t+1|T}-V_{t+1|t})J_t'$; and $V_{t-1,t|T}=J_{t-1}V_{t|T}$ respectively, which are known as the Rauch-Tung-Striebel (RTS) equations.

The computation as set forth in Table 2 can be complicated, e.g., there are matrix inversions in the T+1 step loop, when computing Kalman gain matrix in Fwd operator and the smoother gain matrix in Back operator. And the computational complexity will be $O(TN^3)$, where T is the number of history observations; N is the number of activity states, because for a general N*N matrix, Gaussian elimination for solving the matrix inverse leads to $O(N^3)$ complexity. However, in various embodiments the algorithm implementation can be simplified.

Figure 2:
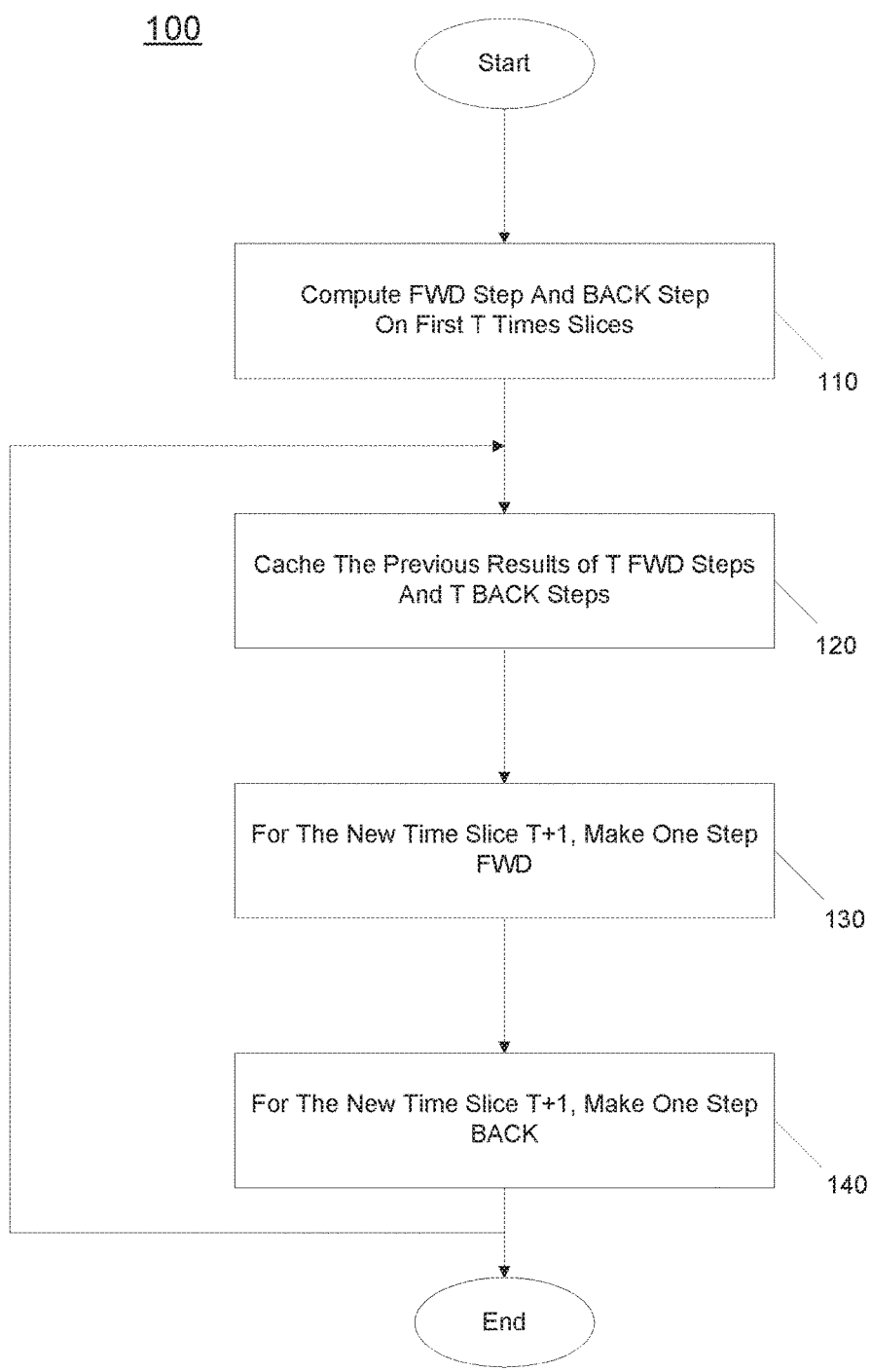
FIG. 2 is a flow diagram of a filter method in accordance with one embodiment of the present invention.

As shown in FIG. 2, which is a flow diagram of a prediction algorithm 100 in accordance with one embodiment of the present invention, the forward and back operations can be computed for a predicted number of intervals (e.g., time slices T=1000) (block 110). Then the previous T step intermediate result of x and V can be cached (block 120), and just one step update of Fwd is made for the new coming time slice T+1 (block 130). Similarly, for the backwards pass, just one step Back operator for the T+1 time slice can be computed (block 140), using the cached previous T step intermediate results. Hence after the simplification, the computational complexity would be $O(N^3)$. Furthermore, the $N=2^{N'}$ (N' is the number of cores inside the same package) processor package activity states can be classified into 3 patterns: all idle, all busy and partial idle, and we use these three patterns to describe the states, so N would become only 3. On the other hand, we simplify the KFM and set A, C, Q, R and initial V as a diagonal matrix with the element values being 0 or 1, to reduce the operation complexity of the algorithm to $O(N)$.

Figure 3:
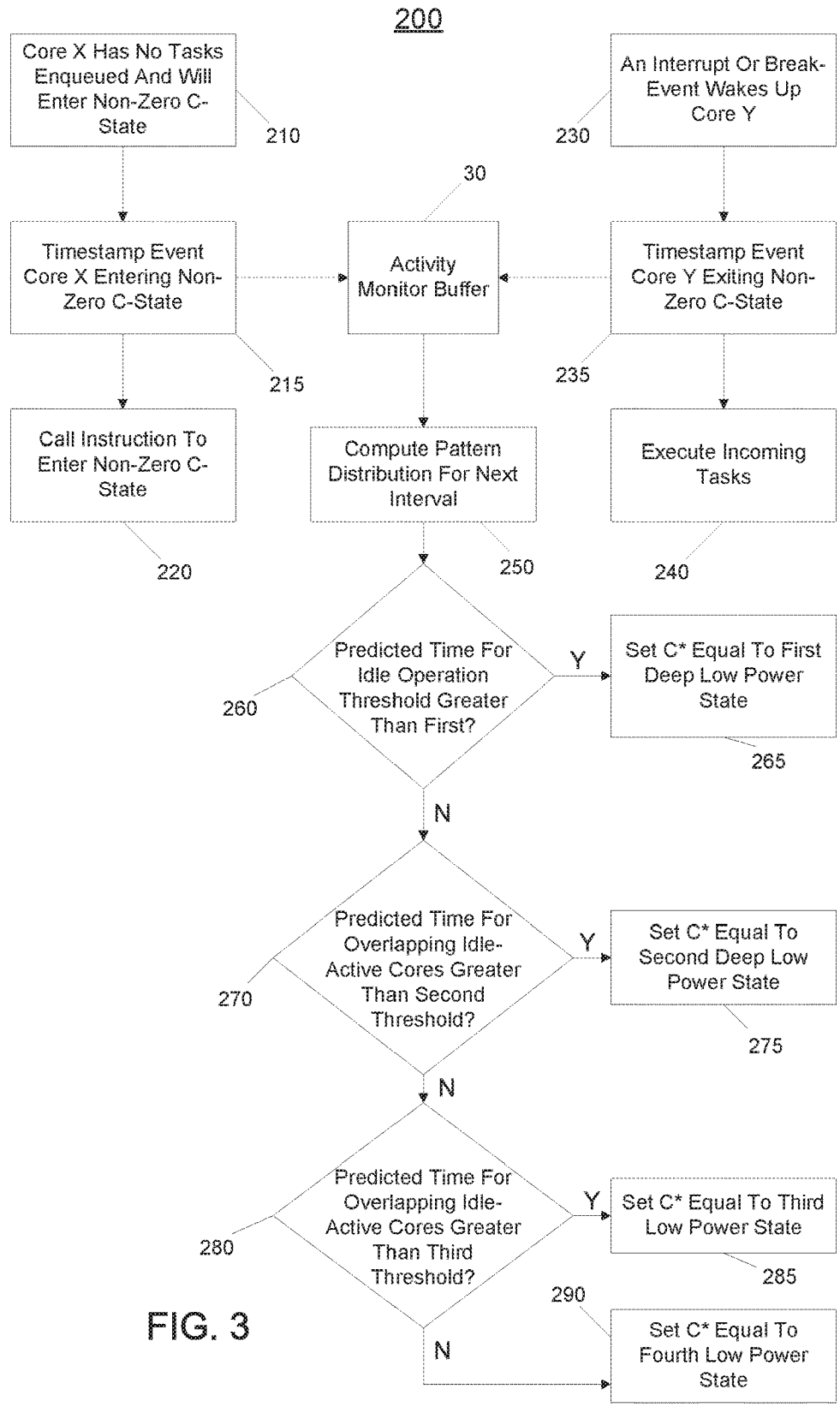
FIG. 3 is a flow diagram of a prediction method in accordance with one embodiment of the present invention.

Referring now to FIG. 3, shown is a flow diagram of a prediction method in accordance with one embodiment of the present invention. More specifically, method 200 of FIG. 3 describes example operation of a system including at least two cores (core X and core Y) of a processor package that can enter into and exit from low power states based on tasks scheduled to these cores. As shown in FIG. 3, during operation activity monitor buffer 30 may receive various time stamp events from the cores. Specifically, assume that core X has no tasks enqueued and thus is ready to enter into a low power state, i.e., a non-zero C-state (block 210). Thus a time stamp event occurs and core X transmits this time stamp information, which may include a time stamp along with the given C-state, to activity monitor buffer 30 (block 215). Then core X may call an instruction such as a monitor wait (mwait) instruction to enter into the non-zero C-state (block 220).

Assume further that another core, i.e., core Y, is currently in a low power state. At block 230, core Y receives an interrupt or break-event to wake up. Thus at block 235, core Y sends a time stamp event to activity monitor buffer 30 to indicate that it is exiting the non-zero C-state. Thus core Y may execute incoming tasks at block 240.

At a regular interval, e.g., 500 microseconds, activity monitor buffer 30 provides its monitored data, which may include time stamp information as well as an indication of the associated activity states to predictor 35. Accordingly, at block 250 predictor 35 may compute a pattern distribution for a next interval. As described above, in some implementations three patterns may be used, although more or fewer patterns can be realized in other embodiments. This information from predictor 35 may then be provided to selector 40.

As described above, selector 40 may operate on a per core or per package basis. For ease of illustration, this discussion is directed to a per package computation. Specifically, at diamond 260 the selector may determine if the predicted time for operation of the package at an idle state (with all cores idle), such as according to a first pattern (e.g., pattern A), during the next interval is greater than a first threshold. In one embodiment, the threshold described in connection with FIG. 3 may be based on speculation of idle cores' headroom to accommodate other cores' tasks without affecting performance. While the scope of the present invention is not limited in this regard, the first threshold may correspond to a given percentage of time of the interval and in one embodiment may be 20%. If so, the C* state may be set equal to a first deep low power state (block 265). For example, in one embodiment this low power state may correspond to the C7 state or another deep low power state (e.g., a deepest low power state).

If instead the time predicted for operation with all cores idle is not greater than the first threshold, control may pass to diamond 270, where it may be determined whether the predicted time for operation of the package at an overlapping state of idle and active cores (at least one active and idle core), such as according to a second pattern (e.g., pattern C), during the next interval is greater than a second threshold. In one embodiment, the second threshold may be 30%. If so, the C* state may be set equal to a second deep low power state (block 275). For example, in one embodiment this deep low power state may correspond to the C6 state, or another such deep low power state, generally at a lesser deep low power state than defined at block 265.

Referring still to FIG. 3, if instead at diamond 270 it is determined that the predicted time for overlapping operation is not greater than the second threshold, control passes to diamond 280, where it may be determined whether the predicted time for overlapping operation of the package during the next interval is greater than a third threshold (which may correspond to 10%, in one embodiment). If so, control passes to block 275, where the C* state may be set equal to a third low power state. For example, in one embodiment this low power state may correspond to the C3 state or other such low power state (namely at a non-deep low power state and lower than the state defined in block 275). Otherwise, control passes to block 290, where the C* state may be set equal to a fourth low power state. For example, in one embodiment this low power state may correspond to the C1 state or other such low power state (namely at a low power state and lower than the state defined in block 285). While shown with this particular implementation in the embodiment of FIG. 3 for a processor with core C1, C3, C6, and C7 support, the scope of the present invention is not limited in this regard.

For purposes of example, Table 3 below shows such core C-states and their descriptions, along with the estimated power consumption in these states, with reference to an example processor having a thermal design power (TDP) of 130 watts (W). Of course it is to be understood that this is an example only, and embodiments are not limited in this regard.

TABLE 3

| | Description | Estimated power consumption |
|---|---|---|
| Core C0 | All core logics active | 26.7 W |
| Core C1 | Core clockgated | 1.5 W |
| Core C3 | Core multi-level cache (MLC) flushed and invalidated | 1 W |

TABLE 3-continued

| | Description | Estimated power consumption |
|---|---|---|
| Core C6 | Core powergated | 0.04 W |
| Core C7 | Core powergated and signals "package (pkg) last level cache (LLC) OK-to-shrink" | 0.04 W |

Table 4 shows an example mapping of core C-states of an example processor to the ACPI C-states. Again it is noted that this mapping is for example only and embodiments are not limited in this regard.

TABLE 4

Core C0→ACPI C0
Core C1→ACPI C1
Core C3→ACPI C1 or C2
Core C6→ACPI C2 or C3
Core C7→ACPI C3

Thus using embodiments of the present invention, real-time monitoring of CPU core and package's overlapping busy-idle activities may be performed. Based on this information, an accurate prediction may be generated to predict future core and package activity levels, from which power saving states for the cores may be selected for maximum power saving based on the prediction results.

Figure 4:
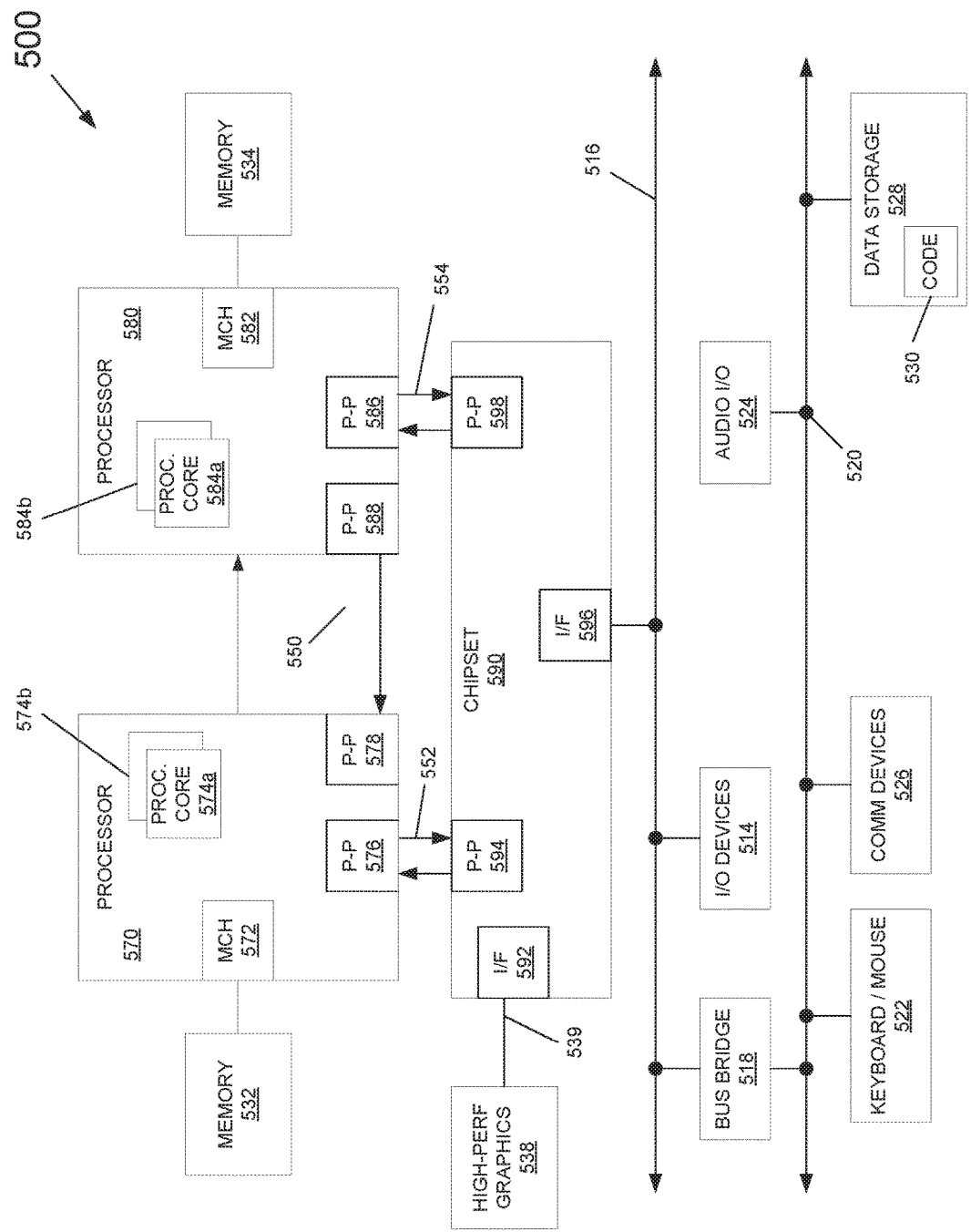
FIG. 4 is a block diagram of a system in accordance with an embodiment of the present invention.

Embodiments may be implemented in many different system types. Referring now to FIG. 4, shown is a block diagram of a system in accordance with an embodiment of the present invention. As shown in FIG. 4, multiprocessor system 500 is a point-to-point interconnect system, and includes a first processor 570 and a second processor 580 coupled via a point-to-point interconnect 550. As shown in FIG. 4, each of processors 570 and 580 may be multicore processors, including first and second processor cores (i.e., processor cores 574*a* and 574*b* and processor cores 584*a* and 584*b*), although additional cores may be present in the processors. Each processor core may be controlled to be in a lower of a determined C* state or an OS-provided C-state when it is idle. Each processor may further include hardware, software, firmware or combinations thereof to enable monitoring of utilization, and generating and using prediction information to enable determination of a C* state level for a next operation interval in accordance with an embodiment of the present invention.

Still referring to FIG. 4, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 2, MCH's 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. As shown in FIG. 4, chipset 590 includes P-P interfaces 594 and 598.

Furthermore, chipset 590 includes an interface 592 to couple chipset 590 with a high performance graphics engine 538, by a P-P interconnect 539. In turn, chipset 590 may be coupled to a first bus 516 via an interface 596. As shown in FIG. 4, various I/O devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A non-transitory computer-readable medium comprising instructions that when executed by a machine enable the machine to:
    identify, in a multicore processor, power state transitions of a plurality of cores of the multicore processor during execution of a workload on the multicore processor, wherein the power state transitions include transitions of the plurality of cores from an active state to an idle state or from the idle state to the active state;
    store information regarding the power state transitions in a storage, the information including timing information;
    predict a future power state transition of a first core of the plurality of cores to occur during the execution of the workload based at least in part on at least some of the information in the storage, the at least some of the information including the timing information; and
    control, by the multicore processor, a power state for at least the first core during the execution of the workload based on the predicted future power state transition.

2. The non-transitory computer-readable medium of claim 1, further comprising instructions that when executed enable the machine to determine a low power state level for the multicore processor for a next operating period.

3. The non-transitory computer-readable medium of claim 2, further comprising instructions that when executed enable the machine to determine the low power state level based on a comparison of at least one of a plurality of patterns based on the power state transitions to a corresponding one of a plurality of thresholds.

4. The non-transitory computer-readable medium of claim 1, further comprising instructions that when executed enable the machine to compute a pattern distribution including a plurality of patterns based on the power state transitions, each pattern to indicate a predicted operation level of at least one of the plurality of cores for a portion of a next operating period during the execution of the workload.

5. The non-transitory computer-readable medium of claim 4, further comprising instructions that when executed enable the system to determine a low power state level for at least a portion of the multicore processor for the next operating period based on the pattern distribution.

6. The non-transitory computer-readable medium of claim 5, further comprising instructions that when executed enable the system to select the determined low power state level or an operating system (OS) power state level to be the power saving state for the first core when the first core is to idle during the next operating period.

7. A method comprising:
    identifying, in a multicore processor, power state transitions of a plurality of cores of the multicore processor during execution of a workload on the multicore processor, wherein the power state transitions include transitions of the plurality of cores from an active state to an idle state or from the idle state to the active state;
    storing information regarding the power state transitions in a storage, the information including timing information;
    predicting a future power state transition of a first core of the plurality of cores to occur during the execution of the workload based at least in part on at least some of the information in the storage, the at least some of the information including the timing information; and
    controlling, by the multicore processor, a power state for at least the first core during the execution of the workload based on the predicted future power state transition.

8. The method of claim 7, further comprising determining a low power state level for the multicore processor for a next operating period.

9. The method of claim 8, further comprising determining the low power state level based on a comparison of at least one of a plurality of patterns based on the power state transitions to a corresponding one of a plurality of thresholds.

10. The method of claim 7, further comprising identifying the power state transitions in a predictor of the multicore processor.

11. An apparatus comprising:
    means for identifying power state transitions of a plurality of cores during execution of a workload on the plurality of cores, wherein the power state transitions include transitions from an active state to an idle state or from the idle state to the active state;
    means for storing information regarding the power state transitions, the information including timing information;
    means for predicting a future power state transition of a first core of the plurality of cores to occur during the execution of the workload based at least in part on at least some of the information, the at least some of the information including the timing information; and
    means for controlling a power state for at least the first core to occur during the execution of the workload based on the predicted future power state transition.

12. The apparatus of claim 11, further comprising means for determining a low power state level for at least one of the plurality of cores for a next operating period during the execution of the workload.

13. The apparatus of claim 12, further comprising means for determining the low power state level based on a comparison of at least one of a plurality of patterns based on the power state transitions to a corresponding one of a plurality of thresholds.

14. An apparatus comprising:
    a plurality of cores;
    a storage; and
    a predictor to identify power state transitions of the plurality of cores during execution of a workload on the plurality of cores, wherein the power state transitions include transitions from an active state to an idle state or from the idle state to the active state, store information regarding the power state transitions in the storage, the information including timing information, predict a future power state transition of a first core of the plurality of cores to occur during the execution of the workload based at least in part on at least some of the information including the timing information, and control a power state for at least the first core during the execution of the workload based on the predicted future power state transition.

15. The apparatus of claim 14, wherein the apparatus comprises a processor package.

16. The apparatus of claim 15, wherein the predictor comprises circuitry of the processor package.

17. The apparatus of claim 14, wherein the apparatus comprises a system including at least one memory, at least one data storage, and at least one processor comprising the plurality of cores.

18. The apparatus of claim 14, wherein the apparatus further comprises an activity monitor to monitor the power state transitions.

19. The apparatus of claim 18, wherein the activity monitor comprises a buffer to store the timing information.

20. The apparatus of claim 14, wherein the timing information comprises timestamp information.

\* \* \* \* \*